(12) United States Patent
Lacroix

(10) Patent No.: US 6,464,249 B1
(45) Date of Patent: Oct. 15, 2002

(54) SELECTIVELY BUFFERED DUAL STAGE AIR BAG ASSEMBLY, AND METHOD OF USING SAME

(76) Inventor: Donald R. Lacroix, 13300 Village Park Dr., No. 3087, Southgate, MI (US) 48195

( * ) Notice: Subject to any disclaimer, the term of this patent is extended or adjusted under 35 U.S.C. 154(b) by 313 days.

(21) Appl. No.: 09/078,247

(22) Filed: May 13, 1998

Related U.S. Application Data

(60) Provisional application No. 60/046,508, filed on May 15, 1997.

(51) Int. Cl.[7] .............................................. B60R 21/24
(52) U.S. Cl. ...................................... 280/729; 280/735
(58) Field of Search ................................ 280/729, 740, 280/742, 743.1, 736, 735; 340/426, 428

(56) References Cited

U.S. PATENT DOCUMENTS

| | | |
|---|---|---|
| 3,761,111 A | 9/1973 | Kemper |
| 3,802,719 A | 4/1974 | Brown |
| 3,900,210 A | 8/1975 | Lohr |
| 4,360,223 A * | 11/1982 | Kirchoff .................... 280/729 |
| 4,397,061 A * | 8/1983 | Kanzaka ........................ 16/2 |
| 5,018,761 A | 5/1991 | Henseler |
| 5,181,697 A | 1/1993 | Rumer |
| 5,240,283 A * | 8/1993 | Kishi et al. ................. 280/729 |
| 5,249,824 A | 10/1993 | Swann ........................ 280/729 |
| 5,282,646 A | 2/1994 | Melvin ....................... 280/729 |
| 5,400,487 A | 3/1995 | Gioutsos |
| 5,413,378 A | 5/1995 | Steffens |
| 5,468,013 A | 11/1995 | Gille ......................... 280/729 |
| 5,516,146 A * | 5/1996 | Kopitzke ................ 280/728.2 |
| 5,518,266 A * | 5/1996 | O'Docherty et al. ..... 280/728.2 |
| 5,562,302 A | 10/1996 | Turnbull |
| 5,562,304 A | 10/1996 | Gest |
| 5,570,900 A | 11/1996 | Brown |
| 5,584,503 A | 12/1996 | Lutz |
| 5,584,506 A | 12/1996 | Wynsberghe |
| 5,602,734 A | 2/1997 | Kithil |
| 5,603,525 A | 2/1997 | Zakula |
| 5,609,363 A | 3/1997 | Finelli |
| 5,613,698 A | 3/1997 | Patercsak |
| 5,613,702 A | 3/1997 | Goetz |
| 5,725,245 A * | 3/1998 | O'Driscoll et al. .......... 280/740 |
| 5,815,087 A * | 9/1998 | Campbell et al. ....... 340/825.54 |
| 5,848,804 A * | 12/1998 | White, Jr. et al. ........ 280/743.1 |
| 5,913,535 A * | 6/1999 | Taguchi et al. ............. 280/729 |
| 5,957,485 A * | 9/1999 | Hirai .......................... 280/729 |

FOREIGN PATENT DOCUMENTS

| | | | | |
|---|---|---|---|---|
| DE | 4121659 A1 * | 1/1993 | ................. | 280/729 |
| GB | 2265118 A * | 9/1993 | ................. | 280/729 |
| JP | 0311930 * | 12/1989 | ................. | 280/729 |

* cited by examiner

Primary Examiner—Paul N. Dickson
Assistant Examiner—David R. Dunn

(57) ABSTRACT

A selectively buffered dual stage air bag assembly, including an outer bag member, and an inner bag member disposed within the outer bag member. The inner bag member includes an outer wall with an outwardly facing surface for deployed placement facing toward a passenger compartment of a vehicle. The outer wall of the inner bag has a plurality of apertures formed therethrough, which define gas discharge ports for discharging gas from the inner bag member to the outer bag member. The inner bag member outwardly facing surface may be reinforced in the area of the apertures, and may have a porous material disposed across the apertures to affect the rate of gas flow therethrough. Preferably, the inner bag member is made from a non-woven, substantially inelastic material. The present invention further provides a method of using an air bag assembly of the type described.

17 Claims, 4 Drawing Sheets

SELECTIVELY BUFFERED DUAL STAGE AIR BAG ASSEMBLY, AND METHOD OF USING SAME

This application claims the benefit of provisional application 60/046,508 filed May 15, 1997.

BACKGROUND OF THE INVENTION

1. Field of the Invention

The present invention relates generally to a dual stage air bag assembly, which acts to reduce the likelihood and/or severity of injury to an occupant when the air bag is inflated and deployed during a collision. More particularly, the invention relates to a dual stage air bag assembly which includes an inner bag member communicating with an outer bag member via a plurality of apertures defining gas discharge outlets. The inner bag member is connected with an inflation mechanism so as to be immediately inflated in its entirety at the time of a collision, while the outer bag member receives gas secondarily in a predetermined flow pattern via the gas discharge outlets in the inner bag member.

2. Description of the Background Art

Air bag devices, for restraining a vehicle occupant in the event of a collision, are well known, and are installed as standard safety equipment in many vehicles. However, a serious problem associated with air bag devices is that when the air bag is automatically inflated and deployed, to restrain an occupant against injury at the time of a collision, the air bag itself may cause injury to the occupant.

Air bag devices are typically designed to inflate rapidly and forcefully, while generally being adapted to effectively restrain an adult driver or passenger of average height and weight in a normal sitting posture. However, for an adult or child of small physical proportions whose sitting posture is unusually low and/or forward in the seat, or for a child fastened in a safety seat, the sudden forceful inflation of a standard air bag may pose a severe and potentially fatal hazard. The forceful inflation of the air bag may cause an impact to such an occupant which itself may cause serious injury, aside from any considerations of other potential injury from a collision.

While attempts have been made to overcome this serious safety hazard associated with conventional air bags, such attempts have proven costly and/or ineffective. One such attempt is an air bag system in which a single air bag is deployed at a relatively slow or fast rate, depending on the user. Another attempt is a level sensor device which is programmed with the occupant's or user's height and weight. Previously issued patents relating to air bags and to attempts to moderate the dangers thereof include U.S. Pat. Nos. 3,802,719, 3,814,458, 3,900,210, 4,265,468, 5,018, 762, 5,181,697, and 5,468,013.

Some air bag designs include an inner bag disposed within an outer bag to modify the deployment action of the air bag. In most instances, this bag-within-a-bag type of design uses either a stretchable elastic inner bag, or a porous inner bag, which may be formed of a woven or knit material.

U.S. Pat. No. 3,761,111 to Kemper discloses a two-part air bag device which includes a foldable and collapsible outer bag, which is sealed all around and made of a gas-tight material. A foldable and collapsible inner bag, smaller than the outer bag and made of a porous material, is disposed inside the outer bag, so that the smaller, porous inner bag is inflated first.

U.S. Pat. No. 3,900,210 to Lohr et al. discloses an air bag assembly similar to the device of Kemper. In the design of Lohr et al., an inner, energy absorbing elastic bag is disposed inside an outer bag. The inner bag has elastic walls which expand under pressure, and is preferred to be made of a knitted material such as, e.g., nylon or polyester. All inflating material is directed into the inner bag, and must diffuse outwardly therefrom into the outer bag, after the inner bag has expanded significantly (50–100%) beyond its initial inflated but unexpanded volume. The outer bag may also be made of an expandable, knitted material. The energy absorbing action of the inner bag (and perhaps the outer bag) of Lohr is provided to reduce the sound level of the explosion associated with the inflation of the air bag.

Although the bag-within-a-bag design for air bags is superior to the single bag design, the use of materials for the inner bag which acts equally at every section thereof, such as elastic materials or porous woven materials, may not be the best approach. Since an occupant in a front seat of a vehicle is likely to impact the outer surface of the bag exclusively, what is needed is a selectively buffered air bag assembly of a two-stage design, which can be designed to selectively direct outwardly expanding gases within the outer bag.

U.S. Pat. No. 5,249,824 to Swann et al. discloses another design for a two-part air bag. In the air bag design of Swann et al., an outer bag is expansible to a predetermined three-dimensional shape, and an expansible inner bag is disposed inside an internal fluid cavity of the outer bag. Both of the inner and outer bags share a common inlet for inflation thereof. The inner bag of Swann is preferred to be made of a woven synthetic material, such as nylon. The inner bag has a plurality of rearwardly facing reinforced vent openings formed in a rear panel thereof, to direct gas under pressure from the inner bag into the outer bag, in a direction away from an occupant impact area thereof, in order to create a radially swirling flow pattern within the outer bag. The rear surface of the outer bag of Swann is also provided with a plurality of vents, enabling the air bag structure to be deflated in a controlled fashion when the air bag is struck by a vehicle occupant.

However, these and other attempts have not been completely effective at providing a simple, cost effective, reliable, and safe air bag which deploys in a selectively buffered fashion, so as to minimize injury caused by the air bag itself.

SUMMARY OF THE INVENTION

The present invention provides a selectively buffered dual stage air bag assembly. The air bag assembly according to the present invention effectively minimizes the danger of injuring passengers during deployment of the air bag, while at the same time ensuring that the occupant will be restrained against injury at the time of a collision. Further, the assembly according to the invention is simplified in structure and relatively inexpensive to produce.

The air bag assembly of the present invention includes an outer bag member, and an inner bag member disposed within the outer bag member. The inner bag member includes an outer wall with an outwardly facing surface for deployed placement facing toward an occupant of a vehicle passenger compartment. The outer wall of the inner bag has a plurality of apertures formed therethrough, which define gas discharge ports for discharging gas from the inner bag member to the outer bag member, in a substantially outward direction, towards the passenger compartment of a vehicle. The material of the inner bag member is preferably reinforced in the area adjacent the apertures, and may, optionally, have a porous material disposed across the apertures to affect the rate of gas flow therethrough. In one embodiment, plastic reinforcing grommets may be provided, attached to the outer layer of the inner bag member to provide reinforcement in the area of the apertures. Preferably, the inner bag member is made from a non-woven, substantially inelastic material, and is constructed of stronger material than the outer bag.

Due to the unique structure and construction of the air bag assembly according to the present invention, the inner bag receives inflating gases directly from an inflating mechanism, such that it is immediately filled to 100% of its volume, thereby providing initial impact resistance for a vehicle occupant, and then the inner bag channels the inflating gases straight outwardly through the apertures in the outer wall thereof and into the outer bag in a predetermined pattern, so that the outer bag is inflated a short time subsequent to the inflation of the inner bag, but still prior to the time that a passenger of the vehicle is likely to contact the air bag assembly.

The present invention further provides a method of using an air bag assembly of the type described.

It is an object of the present invention to minimize danger to vehicle occupants posed by excessively rapid and forceful deployment of vehicle air bags.

It is another object of the present invention to provide a selectively buffered air bag assembly, which will open in two stages to minimize danger of injury to passengers in a vehicle, and which provides selectively buffered gas flow, in a direction towards a vehicle passenger compartment, during inflation of an outer air bag thereof.

Further objects, features, details, and advantages of the invention will become apparent from the following detailed description, when read in conjunction with the accompanying drawings.

DETAILED DESCRIPTION OF THE PRESENTLY PREFERRED EMBODIMENTS

Figure 1:
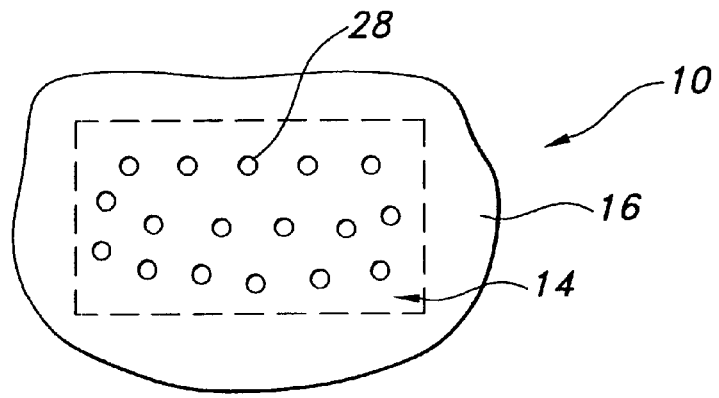
FIG. 1 is a front view of a driver's side air bag assembly according to the invention, in a fully inflated condition, with the inner bag member shown in dashed lines.
Figure 2:
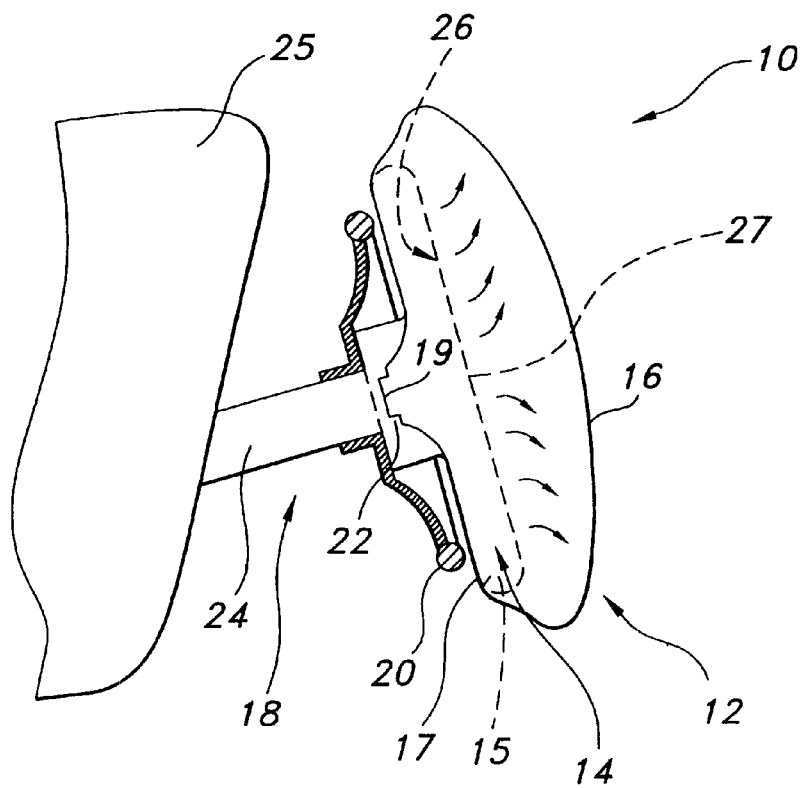
FIG. 2 is a side view of the air bag assembly of FIG. 1 in a fully inflated condition, also showing part of the air bag environment, and partially in cross section.

With reference to FIGS. 1 and 2, a selectively buffered driver's side air bag assembly, according to the present invention, is shown generally at 10. The air bag assembly 10 comprises a selectively buffered dual stage air bag 12, having an inner bag member 14 and an outer bag member 16. The air bag 12 is shown in FIGS. 1 and 2 in its inflated condition, extending outwardly from a vehicle steering assembly 18. The steering assembly 18 includes a steering wheel 20 having a hub 22 supported by a steering column 24, which extends from the vehicle dashboard 25.

In a known manner, the air bag 12, in its deflated state, may be stored in a folded condition within the hub 22. Other known components (not shown) of an air bag system, including an inflation device or system for inflating the air bag 12 with a gas, collision sensor means, and the like, may also be housed within the steering hub 22. If desired, one or more of these components may alternatively be housed in steering column 24, and/or in other suitable parts of the vehicle steering assembly 18 or dashboard area. The details and arrangement of these air bag system components are well known, with illustrative known systems including: the "Vehicle Steering Wheel with an Integrated Gas Bag Module" disclosed in U.S. Pat. No. 5,584,503 issued Dec. 17, 1996 to Lutz; and the "Automobile Air Bag Systems" disclosed in U.S. Pat. No. 5,602,734 issued Feb. 11, 1997 to Kithil. Both of the Lutz and Kithil references are incorporated by reference herein, insofar as they are not inconsistent with the present specification.

The selectively buffered dual stage air bag 12, including inner and outer bag members 14 and 16, respectively, may be fabricated of any suitable air bag material. It will be understood, however, that the inner bag member 14 is preferably fabricated of a heavier gauge or stronger material than outer bag member 16, and that the primary material of the inner bag member not be a knitted, gas-permeable, or elastic material. It is preferred, in the practice of the present invention, that the material of the inner bag potion 14 not be porous except as otherwise described herein, but rather, should be a relatively non-porous material, such as, for example, a flexible plastic sheeting, or a reinforced fabric material which has been sealed so as to be non-porous.

It is also preferred that the material chosen for the inner bag member be substantially inelastic, so that it will fully inflate, but will not substantially stretch or expand after full inflation thereof.

As shown most clearly in FIG. 2, the inner and outer bag members 14 and 16 are integrally connected at the respective base portions 15, 17 thereof, so as to define a unitary overall air bag structure, with outer bag member 16 extending outwardly so as to substantially surround inner bag member 14, when the air bag 12 is in a fully inflated and deployed condition. The bulk of the surface areas of the inner and outer bag members 14, 16 that are most likely to be impacted by a vehicle occupant, are preferably not linked or connected together, and do not have any stitching provided thereon.

The inner bag member 14 includes an outer wall 26, with an outer surface 27 which faces toward the passenger compartment of the vehicle. The outer wall 26 of the inner bag member 14 is provided with a plurality of apertures 28 formed therethrough, to selectively channel gas flow outwardly from the inner bag member 14 to the outer bag member 16, in a substantially straight outward direction toward the likely location of a vehicle occupant, and in a predetermined pattern. The specific pattern of openings to achieve a predetermined direction and amount of gas flow, from the inner bag member 14 to the outer bag member 16, will be selected by the air bag designers for a particular application. Since the material of the inner bag member 14 is substantially non-porous, as noted, gas will flow outwardly from the inner bag member 14 exclusively via the apertures 28.

The apertures 28 define gas discharge outlets, permitting gas flow from inner bag member 14 to outer bag member 16 as described in detail below. To this end, the apertures 28 are dimensioned and positioned so as to obtain the desired pattern of gas flow into outer bag member 16. It will thus be understood that although apertures 28 are shown in FIG. 1 as having a relatively uniform size, the size of apertures 28 may be varied to obtain a desired pattern of gas flow. Likewise, the relative positioning of the apertures 28 may be altered as desired to obtain the desired gas flow pattern. For example, to increase gas flow to peripheral portions of outer bag member 16 over that supplied to central portions, the apertures 28 along the periphery of wall 26 can be enlarged and/or increased in number. Carefully engineered placement, size, and number of the apertures 28 allows for deployment of the air bag assembly 10 hereof to be selectively buffered, to minimize any danger to passengers of a vehicle.

The material of the inner bag member 14, adjacent the outwardly facing apertures 28, may preferably be reinforced therearound with plastic, epoxy, inserts, or the like, for added strength.

Figure 3A:
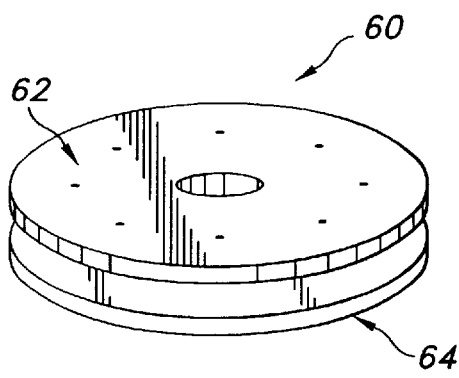
FIG. 3A is an enlarged perspective view of a reinforcing grommet which is usable as one component part of the air bag assembly of FIG. 1 or FIG. 2.
Figure 3B:
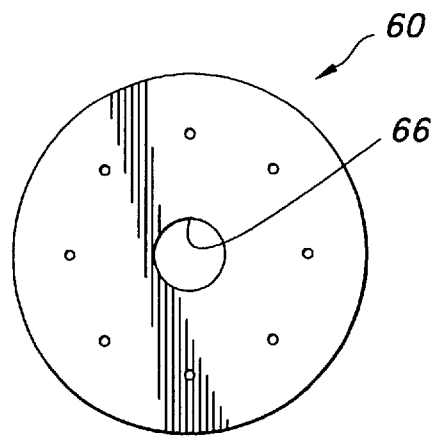
FIG. 3B is a top plan view of the reinforcing grommet of FIG. 3A.
Figure 3C:
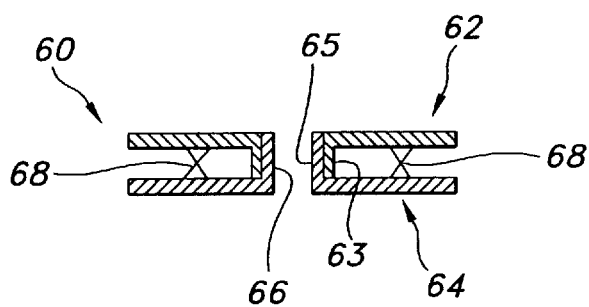
FIG. 3C is a cross-sectional view of the reinforcing grommet of FIG. 3A.

One usable insert for reinforcing the apertures 28 may be a grommet 60, as shown in FIG. 3A. The scale of the drawings in FIGS. 3A–3C is greatly enlarged from the scale of the drawings in FIGS. 1–2, for purposes of illustration. In a preferred embodiment of the present invention, a plurality of reinforcing grommets 60, as shown in FIGS. 3A–3C, may be attached to the outer wall 26 of the inner bag member 14, with one grommet 60 reinforcing and surrounding each aperture 28. The grommets 60 are formed from a high-strength plastic or from a similar material.

Each grommet 60 includes an upper disc member 62 and a lower disc member 64 which are attached to one another by an interference fit therebetween. The upper disc member 62 includes a downwardly extending first collar 63, which fits slidably and interferingly around an upwardly extending second collar 65 of the lower disc member 64. The second collar 65 has a flow channel 66 formed therethrough, which fits inside a selected aperture 28, and which channels gas flow therethrough. Preferably, both the upper and lower disc members 62, 64 have protrusions such as dimples 68 extending inwardly thereon, to pinch the outer wall 26 of the inner bag member 14 therebetween, in order to attach the grommet to the outer wall. The grommets 60 may be pressed into place on the outer wall 26 during a preliminary stage of manufacturing the air bag assembly 10, or may be both pressed on and epoxied on to, or otherwise glued on to the outer wall 26.

Other types of grommets than the grommet 60 specifically shown and described could be used, including a type which attached from the outside surface 27 of the outer wall 26 only. A single reinforing piece such as the lower disc member 64 could be placed in contact with the outer wall 26 with the collar 65 thereof placed through an aperture 28, and the disc member 64 could be epoxied or otherwise affixed to the inner bag member 14.

Figure 8:
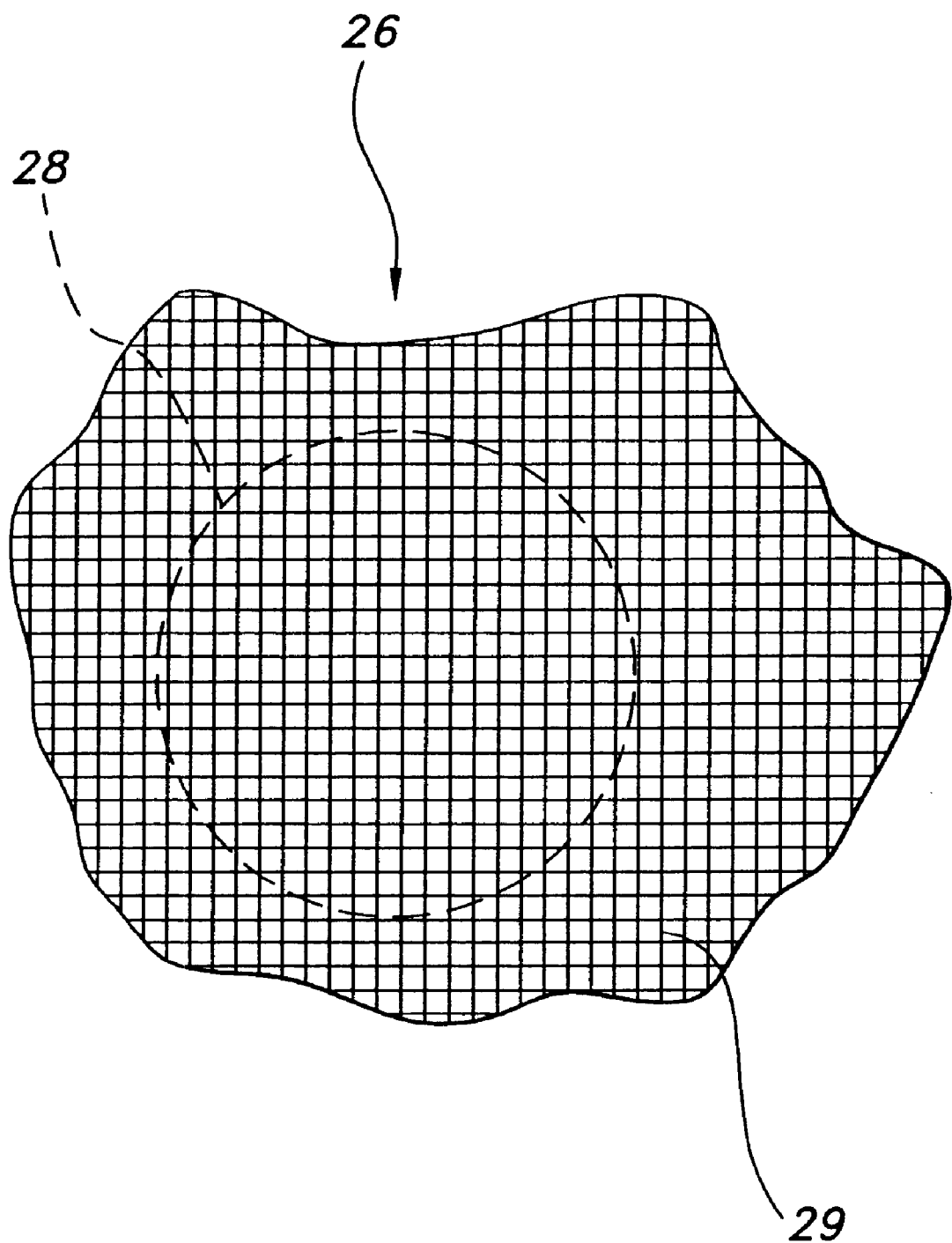
FIG. 8 is a detail plan view of the inner bag member of the assembly of FIGS. 1–2, taken from a vantage point inside the inner bag member, looking outwardly and showing an optional porous material in covering relation to an aperture of the inner bag member outer wall.

The apertures 28 may simply be open passages through the outer wall 26 of the inner bag member 14. Referring now to FIG. 8, a portion of the inner bag member outer wall is seen from a vantage point inside the inner bag member 14, looking outwardly therefrom. Optionally and alternatively, a porous material 29, of a desired flow characteristic, may be disposed within the inner bag member 14, aligned with the outer wall 26 and extending across the apertures 28, in order to control the fill rate of the outer bag member 16. Where used, the porous material 29 is attached to the inner surface of the outer wall 26 in conventional fashion. Applicant has determined that the ratio of the total area of the apertures 28, in comparison to the total area of the outer surface 27 of the inner bag member 14 should be less than 20%, and preferably less than 10% Some flexibility of this figure may be possible where a porous material is disposed across and covering the apertures 28.

OPERATION OF THE AIR BAG ASSEMBLY

When the air bag 12 is folded in its deflated condition, the inner inflation opening 19 of inner bag member 14 is connected with the fully charged air bag inflation device described above. When a collision occurs, the inflation device is activated so as to rapidly discharge gas into inner bag member 14 to inflate same substantially instantaneously. At the same time, gas flows from inner bag member 14 to outer bag member 16, exclusively via the apertures 28. Thus, while inner bag member 14 is inflated substantially instantaneously, full inflation of outer bag member 16 lags slightly behind that of inner bag member 14. It will be understood that outer bag member 16 also inflates very rapidly upon the occurrence of a collision, so as to afford substantially immediate restraint of the occupant. However, full inflation of outer bag member 16 is slightly delayed, relative to full inflation of inner bag member 14, to avoid excessively rapid and forceful deployment of the air bag 12, so as to minimize danger to vehicle occupants posed by the air bag itself.

The dual stage functioning of the air bag assembly according to the invention, as described above, affords significant functional advantages. First, although full inflation of outer bag member 16 is slightly delayed, full inflation of inner bag member 14 occurs substantially instantaneously upon the occurrence of a collision. Thus, inner bag member 14 is fully deployed to protect the occupant immediately. Secondly, because gas is discharged into outer bag member 16 exclusively through the apertures 28, rather than being discharged directly, the strong forces associated with conventional single stage air bags are substantially effectively dampened, so as to protect the occupant from a sudden forceful impact by the air bag itself. Because gas is discharged into outer bag member 16 through the spaced apart apertures 28, the gas flow into outer bag member 16 is substantially diffused or buffered, even though full inflation is achieved very rapidly.

Figure 4:
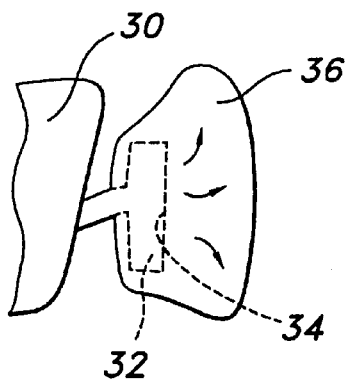
FIG. 4 is a side view of a passenger's side air bag assembly according to a first embodiment of the invention, in a fully inflated condition, with the inner bag member shown in dashed lines.
Figure 5:
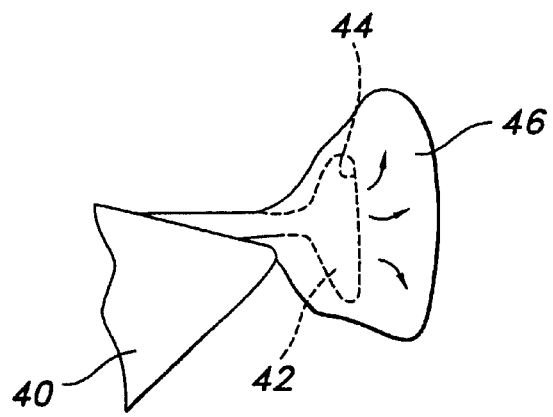
FIG. 5 is a side view of a second embodiment of a passenger's side air bag assembly according to the invention.
Figure 6:
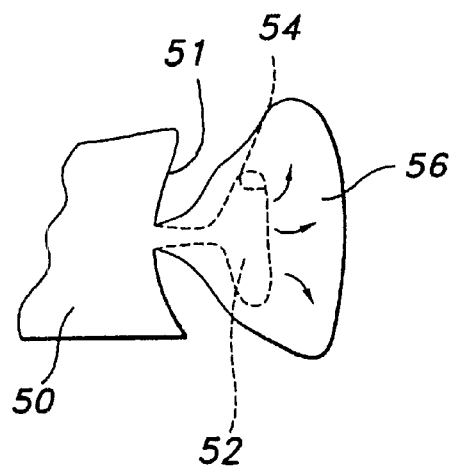
FIG. 6 is a side view of a third embodiment of a passenger's side air bag assembly according to the invention.

Turning to FIGS. 4–6, various embodiments of a passenger's side air bag assembly in accordance with the invention will now be described.

As shown in FIG. 4, the dual stage air bag assembly may be adapted to be deployed from a front wall of a passenger's side dashboard portion 30. The various inflation components, including an inflation device, collision sensor means, and the like, may preferably be disposed within a suitable housing provided within the dashboard portion 25. As in the above-described driver's side embodiment, the inner bag member 32 has an outer wall 34 provided with a plurality of apertures 28 (FIG. 1) which define gas discharge outlets for gas flow from inner bag member 32 to outer bag member 36. Thus, as in the prior embodiment, full inflation of outer bag member 36 will occur rapidly at the time of a collision, but will lag slightly behind inflation of inner bag member 32.

With reference to FIG. 5, there is shown another passenger's side embodiment of the dual stage air bag assembly of the invention which is inflated and deployed from an upper side of a dashboard portion 40. This embodiment of the invention is particularly suitable for use with dashboard configurations having relatively steeply sloped wall portions as shown. As in the above-described embodiments, the inner bag member 42 has an outer wall 44 provided with apertures 28 (FIG. 1) which define gas discharge outlets for gas flow from inner bag member 42 to outer bag member 46, so that full inflation of outer bag member 46 lags slightly behind inflation of inner bag member 42.

As shown in FIG. 6, the dual stage air bag assembly may also be adapted for installation in a cockpit-style passenger side dashboard portion 50 having a concave front wall 51. In this embodiment, the inner bag member 52 with apertured outer wall 54, and the outer bag member 56, are deployed from a central part of the convex front wall 51 of dashboard portion 50.

As will be understood from FIGS. 4-6, it is contemplated that passenger side embodiments of the dual stage air bag assembly may be adapted as necessary to accommodate varying dashboard configurations. Depending upon the particular installation, the various components of the air bag assembly are preferably stored in the deflated and folded state in a suitable housing provided within the dashboard, with the inner and outer air bag members folded for storage. In addition, the means for connecting the air bag to an inflation device, and/or the configuration of the inner and outer air bag members, may be adapted as necessary to permit full deployment for restraining and protecting a passenger at the time of a collision. In each such embodiment, however, the device functions to fully inflate and deploy the inner air bag member substantially instantaneously when a collision occurs, while full inflation of the outer air bag member is slightly delayed. In this manner, as in the embodiment of FIGS. 1 and 2, the occupant will not be subjected to any sudden forceful impact from the air bag itself when it is deployed.

Figure 7:
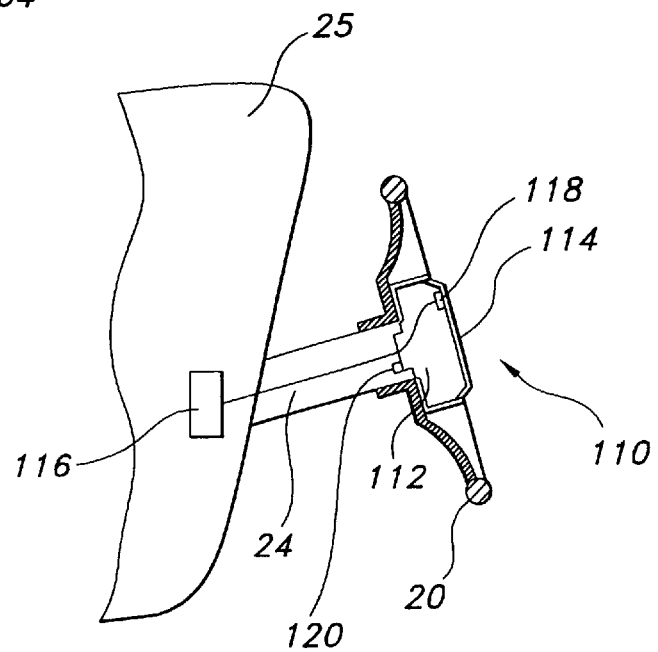
FIG. 7 is a side view of an air bag assembly in accordance with an optional fourth embodiment of the present invention in a fully compressed condition, also showing part of the air bag environment, and partially in cross section.

Referring now to FIG. 7, an optional embodiment of an air bag assembly in accordance with the present invention is shown generally at 110, in a fully deflated and folded condition, including an air bag 112 disposed within a housing 114 attached to the vehicle steering wheel 20. An electronic activator 116 is in electronic communication with the air bag assembly 110 for activation thereof.

In this embodiment, the air bag 112 is provided with an identification tag 118 attached thereto. The identification tag 118 could indicate whether the air bag 112 is an original equipment part or a replacement, and could include a serial number unique to the air bag 112. In this optional embodiment, an electronic sensor 120 is also provided to detect attempted removal of either the air bag 112 of the identification tag 118. Both the air bag 112 and the identification tag 118 are linked electronically to the electronic activator 116 by way of the sensor 120, so that tampering with the assembly 110, by attempting to remove either of the air bag 112 or the identification tag 118, would result in deployment of the air bag 112.

It will be understood that the particular size and shape of the inner and outer air bag members are not limited to those shown in FIGS. 1–6. Rather, the relative dimensions and shapes of the inner and outer bag members may be modified as desired to achieve effective restraint of the occupant while ensuring against any forceful impact to the occupant from the air bag.

While there have been described above what are at present believed to be the preferred embodiments of the invention, it will be understood that various modifications may be made therein without departing from the spirit and scope of the invention. The present embodiments are therefore to be considered in all respects as illustrative, and not restrictive.

I claim:

1. A selectively buffered dual stage air bag assembly, comprising:

an outer bag member;

an inner bag member disposed within the outer bag member, said inner bag member having a deployed configuration which includes an outer wall with an outwardly facing surface for deployed placement facing toward a passenger compartment of a vehicle, said outer wall of said inner bag having a plurality of apertures formed therethrough, which define gas discharge ports for discharging gas from the inner bag member to the outer bag member;

wherein said inner bag member is formed from a substantially inelastic material and wherein said assembly comprises a reinforcing material attached to said outer wall of said inner bag member proximate each of said apertures said reinforcing material being selected from the group consisting of plastic, epoxy, and inserts; and wherein each of said inserts, where used comprises a collar which passes through an aperture of said inner bag member and which defines a flow channel therethrough.

2. The air bag assembly of claim 1, further comprising a porous material disposed across said apertures to affect the rate of gas flow therethrough.

3. The air bag assembly of claim 1, wherein said reinforcing material comprises inserts which include a plurality of grommets attached to acid inner bag members.

4. The air bag assembly of claim 3, wherein each of said grommets comprises a first disc member and a second disc member for attaching to the first disc member, each of said disc members having a wall contacting surface with a plurality of protrusions thereon for pinching said outer wall of said inner bag member therebetween.

5. The air bag assembly of claim 4, wherein said inner bag member is made from a flexible plastic material.

6. The air bag assembly of claim 3, wherein each of said grommets comprises a first disc member having a first collar attached thereto and a second disc member having a second collar attached thereto wherein the first collar fits slidingly and interferingly around the second collar to affix the first disc member to the second disc member.

7. The air bag assembly of claim 1, wherein said inner bag member is made from a non-woven material.

8. The air bag assembly of claim 1, further comprising an electronic theft deterrent system, comprising:

a housing;

said air bag assembly being folded and stored within said housing; and an electronic activator for triggering deployment of said air bag assembly, said electronic activator being in electronic communication with said air bag assembly; and sensing means for sensing disconnection of said electronic communication between said air bag assembly and said electronic activator, said sensing means being in electronic communication with said electronic activator;

wherein said electronic activator is operable to initiate deployment of said air bag assembly when interruption of electronic communication between said air bag and said electronic activator is sensed by said sensing means.

9. The assembly of claim 1, wherein said reinforcing material is plastic.

10. The assembly of claim 1, wherein said reinforcing material is applied contacting both an inner surface and an outer surface of said inner bag member outer wall.

11. a method of using an air bag assembly, comprising the steps of:

inflating an inner bag member, said inner bag member being disposed within an outer bag member, said inner bag member having an outer wall with an inwardly facing surface for deployed placement facing toward a passenger compartment of a vehicle, said outer wall of said inner bag member having a plurality of apertures formed therethrough which define gas discharge ports wherein said assembly comprises a reinforcing material attached to said outer wall of said inner bag member proximate each of said apertures, said reinforcing material being selected from the group consisting of plastic, epoxy, and inserts; and discharging gas from said inner bag member through said apertures in a direction toward a passenger compartment of a vehicle to inflate said outer bag member.

12. The method of claim 11, wherein said gas is initially discharged in a direction which is substantially normal to said outer surface of said inner bag member.

13. The method of claim 11, wherein said reinforcing material comprises inserts which include a plurality of reinforcing grommets attached to said outer wall of said inner bag member, and wherein said gas is discharged through flow channels formed through said grommets.

14. The method of claim 11, wherein said inner bag member inflates to a fully inflated configuration thereof, and subsequently retains said fully inflated configuration, and does not further expand to become larger than said fully expanded configuration.

15. An electronic theft deterrent system for an air bag, comprising:

a housing;

an air bag folded and stored within the housing; and an electronic activator for triggering deployment of said air bag, said electronic activator being in electronic communication with said air bag; and sensing means for sensing disconnection of said electronic communication between said air bag and said electronic activator, said sensing means being in electronic communication with said electronic activator;

wherein said electronic activator is operable to initiate deployment of said air bag when interruption of electronic communication between said air bag and said electronic activator is sensed by said sensing means.

16. The theft deterrent system of claim 15, further comprising an identification tag attached to said air bag.

17. The theft deterrent system of claim 16, wherein said identification tag is also in electronic communication with said sensing means.

* * * * *